US010001954B2

(12) United States Patent
Minagawa

(10) Patent No.: US 10,001,954 B2
(45) Date of Patent: Jun. 19, 2018

(54) INFORMATION PROCESSING APPARATUS, METHOD FOR CONTROLLING THE SAME, AND STORAGE MEDIUM TO IDENTIFY A FUNCTION OF A REGISTER PRINTING APPARATUS BASED ON PRINTING APPARATUS TYPE AND TO DISPLAY A PRINT SCREEN BASED ON IDENTIFIED FUNCTION

(71) Applicant: CANON KABUSHIKI KAISHA, Tokyo (JP)

(72) Inventor: Tomonori Minagawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 99 days.

(21) Appl. No.: 14/543,530

(22) Filed: Nov. 17, 2014

(65) Prior Publication Data
US 2015/0138589 A1   May 21, 2015

(30) Foreign Application Priority Data

Nov. 20, 2013  (JP) ................................. 2013-240036

(51) Int. Cl.
*G06F 3/12* (2006.01)
(52) U.S. Cl.
CPC .......... *G06F 3/1218* (2013.01); *G06F 3/1205* (2013.01); *G06F 3/1255* (2013.01); *G06F 3/1285* (2013.01)
(58) Field of Classification Search
CPC .... G06F 3/1228; G06F 3/1205; G06F 3/1285; G06F 3/1255
See application file for complete search history.

(56) References Cited

U.S. PATENT DOCUMENTS

| 6,189,050 | B1* | 2/2001 | Sakarda | G06F 9/4411 709/220 |
| --- | --- | --- | --- | --- |
| 2005/0111866 | A1* | 5/2005 | Sato | G03G 15/5016 399/79 |
| 2008/0259390 | A1* | 10/2008 | Murase | 358/1.15 |
| 2009/0109473 | A1* | 4/2009 | Kato | G06F 3/1256 358/1.15 |
| 2009/0157906 | A1* | 6/2009 | Yanagi | G06F 3/1205 710/5 |
| 2010/0214587 | A1* | 8/2010 | Sambe | 358/1.13 |
| 2010/0245877 | A1* | 9/2010 | Wei et al. | 358/1.13 |
| 2011/0199629 | A1* | 8/2011 | Sensu | H04N 1/00411 358/1.13 |
| 2011/0286022 | A1* | 11/2011 | Kakitsuba | G06F 3/1204 358/1.13 |
| 2015/0172483 | A1* | 6/2015 | Kishida | H04N 1/00474 358/1.13 |

FOREIGN PATENT DOCUMENTS

| CN | 101556531 A | 10/2009 |
| --- | --- | --- |
| CN | 102123223 A | 7/2011 |
| JP | 2011054013 A | 3/2011 |
| JP | 2011243067 A | 12/2011 |
| JP | 2013182367 A | 9/2013 |

* cited by examiner

*Primary Examiner* — Ming Hon
(74) *Attorney, Agent, or Firm* — Canon U.S.A., Inc. IP Division

(57) ABSTRACT

An information processing apparatus displays a print setting screen based on configuration setting information of a selected device type. The printing setting information set via the print setting screen is used along with print data to generate a print job that is sent to a selected printer.

9 Claims, 17 Drawing Sheets

FIG.4

| CAPABILITY No. | CAPABILITY | MODEL SPECIFIC CAPABILITY | DEVICE TYPES | | | |
|---|---|---|---|---|---|---|
| | | | STANDARD | MFP-xxxSeries | SFP-xxxSeries | Anywhere Print |
| 401 | 402 | 403 | 404 | 405 | 406 | 407 |
| 1 | DEVICE TYPE | NO | A4 B&W | A3 COLOR | A4 COLOR | A3 COLOR |
| 2 | STAPLING | NO | OFF | ON | OFF | ON |
| 3 | TWO-SIDED PRINTING | NO | OFF | ON | ON | ON |
| 4 | BOOKBINDING PRINTING | NO | OFF | OFF | DISABLED | DISABLED |
| 5 | CASE BOOKBINDING | NO | OFF | DISABLED | DISABLED | DISABLED |
| 6 | PAPER TYPE PROCESSING METHOD | YES | NONE | SELECT PAPER FEED STAGE | SET FIXING TEMPERATURE | NONE |
| 7 | PAPER SIZE PROCESSING CAPABILITIES | YES | FIG. 6A | FIG. 6C | FIG. 6D | FIG. 8B |

CONFIGURATION SETTINGS — 500

- 501 — DEVICE TYPE [STANDARD ▽] [IMPORT] — 502
- 503 — COMMON CAPABILITIES — 504
  - DEVICE TYPE [A4 BLACK&WHITE ▽]
  - ☐ STAPLING — 505
  - ☐ TWO-SIDED PRINTING — 506
  - ☐ BOOKBINDING PRINTING — 507
  - ☐ CASE BOOKBINDING — 508
- 509 — MODEL SPECIFIC CAPABILITIES
  - PAPER TYPE PROCESSING METHOD [NONE ▽] — 510
- 511 — PAPER SIZE PROCESSING CAPABILITIES [SET DETAILS] — 512
- [ACQUIRE CONFIGURATION INFORMATION] — 513
- [OK] [CANCEL] [APPLY]
  - 514   515   516

FIG.5B

CONFIGURATION SETTINGS

- DEVICE TYPE [STANDARD ▽] [IMPORT]
- COMMON CAPABILITIES
  - DEVICE TYPE [A3 COLOR ▽]
  - ☑ STAPLING
  - ☑ TWO-SIDED PRINTING
  - ☑ BOOKBINDING PRINTING
  - ☑ CASE BOOKBINDING
- MODEL SPECIFIC CAPABILITIES
  - PAPER TYPE PROCESSING METHOD [SELECT PAPER FEED STAGE ▽]
  - PAPER SIZE PROCESSING CAPABILITIES [SET DETAILS]
- [ACQUIRE CONFIGURATION INFORMATION]
- [OK] [CANCEL] [APPLY]

FIG.5C

| CONFIGURATION SETTINGS |
|---|

DEVICE TYPE [MFP-xxxSeries ▽] [IMPORT]

COMMON CAPABILITIES
  DEVICE TYPE [A3 COLOR ▽]
  ☑ STAPLING
  ☑ TWO-SIDED PRINTING
  ☐ BOOKBINDING PRINTING
  ☐ CASE BOOKBINDING

MODEL SPECIFIC CAPABILITIES
  PAPER TYPE PROCESSING METHOD [SELECT PAPER FEED STAGE ▽]
  PAPER SIZE PROCESSING CAPABILITIES [SET DETAILS]

[ACQUIRE CONFIGURATION INFORMATION]

[OK] [CANCEL] [APPLY]

FIG.5D

| CONFIGURATION SETTINGS |
|---|

DEVICE TYPE [SFP-xxxSeries ▽] [IMPORT]

COMMON CAPABILITIES
  DEVICE TYPE [A4 COLOR ▽]
  ☐ STAPLING
  ☑ TWO-SIDED PRINTING
  ☐ BOOKBINDING PRINTING
  ☐ CASE BOOKBINDING

MODEL SPECIFIC CAPABILITIES
  PAPER TYPE PROCESSING METHOD [SET FIXING TEMPERATURE ▽]
  PAPER SIZE PROCESSING CAPABILITIES [SET DETAILS]

[ACQUIRE CONFIGURATION INFORMATION]

[OK] [CANCEL] [APPLY]

FIG.6A

|  | TWO-SIDED PRINTING | STAPLING POSITIONS ||||
|---|---|---|---|---|---|
|  |  | UPPER RIGHT | UPPER LEFT | SHORT SIDE DOUBLE | LONG SIDE DOUBLE |
| A4 | UNUSABLE | UNUSABLE | USABLE | UNUSABLE | UNUSABLE |
| A5 | UNUSABLE | UNUSABLE | USABLE | UNUSABLE | UNUSABLE |
| B5 | UNUSABLE | UNUSABLE | USABLE | UNUSABLE | UNUSABLE |

FIG.6B

|  | TWO-SIDED PRINTING | STAPLING POSITIONS ||||
|---|---|---|---|---|---|
|  |  | UPPER RIGHT | UPPER LEFT | SHORT SIDE DOUBLE | LONG SIDE DOUBLE |
| A3 | USABLE | USABLE | USABLE | USABLE | UNUSABLE |
| A4 | USABLE | USABLE | USABLE | USABLE | USABLE |
| A5 | USABLE | USABLE | USABLE | UNUSABLE | USABLE |
| B4 | USABLE | USABLE | USABLE | USABLE | UNUSABLE |
| B5 | USABLE | USABLE | USABLE | UNUSABLE | USABLE |
| LETTER | USABLE | USABLE | USABLE | USABLE | USABLE |
| LEGAL | USABLE | USABLE | USABLE | USABLE | USABLE |
| POSTCARD | USABLE | UNUSABLE | UNUSABLE | UNUSABLE | UNUSABLE |
| ENVELOPE | UNUSABLE | UNUSABLE | UNUSABLE | UNUSABLE | UNUSABLE |

FIG.6C

|  | TWO-SIDED PRINTING | STAPLING POSITIONS ||||
|---|---|---|---|---|---|
|  |  | UPPER RIGHT | UPPER LEFT | SHORT SIDE DOUBLE | LONG SIDE DOUBLE |
| A3 | USABLE | USABLE | USABLE | USABLE | UNUSABLE |
| A4 | USABLE | USABLE | USABLE | USABLE | USABLE |
| A5 | USABLE | USABLE | USABLE | UNUSABLE | USABLE |
| B4 | USABLE | USABLE | USABLE | USABLE | UNUSABLE |
| B5 | USABLE | USABLE | USABLE | UNUSABLE | USABLE |
| POSTCARD | USABLE | UNUSABLE | UNUSABLE | UNUSABLE | UNUSABLE |
| ENVELOPE | UNUSABLE | UNUSABLE | UNUSABLE | UNUSABLE | UNUSABLE |

FIG.6D

|  | TWO-SIDED PRINTING | STAPLING POSITIONS ||||
|---|---|---|---|---|---|
|  |  | UPPER RIGHT | UPPER LEFT | SHORT SIDE DOUBLE | LONG SIDE DOUBLE |
| A4 | USABLE | USABLE | USABLE | UNUSABLE | UNUSABLE |
| A5 | UNUSABLE | USABLE | USABLE | UNUSABLE | UNUSABLE |
| B5 | USABLE | USABLE | USABLE | UNUSABLE | UNUSABLE |
| POSTCARD | UNUSABLE | UNUSABLE | UNUSABLE | UNUSABLE | UNUSABLE |
| ENVELOPE | UNUSABLE | UNUSABLE | UNUSABLE | UNUSABLE | UNUSABLE |

FIG.7A

PRINT SETTINGS 700

- 701 PAPER SIZE: A4 ▽ [A4, A5, B5]
- 702 PAPER ORIENTATION: ● PORTRAIT ○ LANDSCAPE
- 703 NUMBER OF COPIES: 1 COPY(COPIES)
- 704 MAGNIFICATION: 100 %
- 705 PAPER TYPE: NONE ▽
- 706 PRINTING METHOD: ONE-SIDED PRINTING ▽
- 707 STAPLING: NONE ▽

[OK] [CANCEL] [APPLY]

FIG.7B

PRINT SETTINGS

- PAPER SIZE: A4 ▽ [A3, A4, A5, B4, B5, POSTCARD, ENVELOPE]
- PAPER ORIENTATION: ● PORTRAIT ○ LANDSCAPE
- NUMBER OF COPIES: 1 COPY(COPIES)
- MAGNIFICATION: 100 %
- PAPER TYPE: PLAIN PAPER ▽ [PLAIN PAPER, THICK PAPER, OHP]
- PRINTING METHOD: ONE-SIDED PRINTING ▽ [ONE-SIDED PRINTING, TWO-SIDED PRINTING, BOOKBINDING PRINTING, CASE BOOKBINDING PRINTING]
- STAPLING: NONE ▽ [NONE, UPPER RIGHT, UPPER LEFT, SHORT SIDE DOUBLE, LONG SIDE DOUBLE]

[OK] [CANCEL] [APPLY]

FIG.8A

| CONFIGURATION SETTINGS |
|---|

DEVICE TYPE [Anywhere Print ▽] [IMPORT]

COMMON CAPABILITIES
    DEVICE TYPE [A3 COLOR ▽]
    ☑ STAPLING
    ☑ TWO-SIDED PRINTING
    ☐ BOOKBINDING PRINTING
    ☐ CASE BOOKBINDING

MODEL SPECIFIC CAPABILITIES
PAPER TYPE PROCESSING METHOD [NONE ▽]
PAPER SIZE PROCESSING CAPABILITIES [SET DETAILS]

[ACQUIRE CONFIGURATION INFORMATION]

[OK] [CANCEL] [APPLY]

FIG.8B

|  | TWO-SIDED PRINTING | STAPLING POSITIONS ||||
|---|---|---|---|---|---|
|  |  | UPPER RIGHT | UPPER LEFT | SHORT SIDE DOUBLE | LONG SIDE DOUBLE |
| A3 | USABLE | USABLE | USABLE | USABLE | UNUSABLE |
| A4 | USABLE | USABLE | USABLE | UNUSABLE | UNUSABLE |
| A5 | UNUSABLE | USABLE | USABLE | UNUSABLE | UNUSABLE |
| B4 | USABLE | USABLE | USABLE | USABLE | UNUSABLE |
| B5 | USABLE | USABLE | USABLE | UNUSABLE | UNUSABLE |
| POSTCARD | UNUSABLE | UNUSABLE | UNUSABLE | UNUSABLE | UNUSABLE |

FIG.13C

| GENERAL | SHARE | PORT | DETAILED SETTINGS | COLOR MANAGEMENT | SECURITY | DEVICE SETTINGS | FAVORITE |

DEVICE INFORMATION ACQUISITION: MANUAL     TYPE: POD DEVICE    [SELECT(Z)]   [EDIT(X)]

DEVICE TYPE(V): [A3 ▼] [COLOR ▼] [MFP ▼]

DISCHARGE SETTINGS
- FINISHER(H): [NONE ▼]
- STACKER TYPE(K): [NONE ▼]
- [SET DISCHARGE DETAILS(7)...]

FUNCTION SETTINGS
- ☑ TWO-SIDED PRINTING(2)    ☐ SHIFT(O)
- ☐ STAPLING(E)
- PUNCH HOLE(C): [NONE ▼]
- ☐ SADDLE STITCH(I)    ☐ SADDLE PRESS(S)
- ☐ CASE BOOKBINDING(1)
- ☐ CUTTING (FRONT EDGE)(D)    ☐ CUTTING (TOP AND BOTTOM)(A)
- FOLDING(R): [NONE ▼]

PAPER FEED SETTINGS
- PAPER FEED OPTION(S): [NONE]
- INSERTER TYPE(M): [NONE]
- [SET PAPER FEED DETAILS(6)...]
- [SET PAPER FEED DETAILS(8)...]
- [ASSIGN PAPER FEED METHOD AND PAPER(T)...]

OTHER SETTINGS
- INTERNAL SPOOL PROCESSING(P): [AUTOMATIC ▼]
- ☐ DEVICE SECURITY PRINT FUNCTION(V)
- ☐ USE SECTION-BASED ID MANAGEMENT FUNCTION(J)   [SET(I)...]
- ☑ SET USER INFORMATION(L)   [SET(W)...]

[SET DETAILS(Q)...]   [DEVICE FUNCTIONS(U)...]   [SET FONT(F)...]

[ACQUIRE DEVICE INFORMATION(G)...]   [VERSION INFORMATION(B)]

[OK]   [CANCEL]   [APPLY(A)]   [HELP]

INFORMATION PROCESSING APPARATUS, METHOD FOR CONTROLLING THE SAME, AND STORAGE MEDIUM TO IDENTIFY A FUNCTION OF A REGISTER PRINTING APPARATUS BASED ON PRINTING APPARATUS TYPE AND TO DISPLAY A PRINT SCREEN BASED ON IDENTIFIED FUNCTION

BACKGROUND

Field

Aspects of the present invention generally relate to an information processing apparatus for controlling a plurality of types of peripheral apparatuses having different functions, a method for controlling the information processing apparatus, and a storage medium.

Description of the Related Art

There has been a universal printer driver for controlling a plurality of types of printers having different functions. For example, Japanese Patent Application Laid-Open No. 2011-243067 discusses a technique for storing functions of each printer in a database and, based on identification information acquired from a connected printer, identifying functions of the printer which issued the identification information.

However, the technique discussed in Japanese Patent Application Laid-Open No. 2011-243067 is not seen to address the following. Specifically, although information about functions of a known printer can be stored in the database, information about functions of a printer with unknown specifications scheduled to be put on the market cannot be stored therein. Therefore, there has been a problem that, even if an identifier of the connected printer is obtained, a screen suitable for the printer cannot be displayed.

SUMMARY

According to an aspect of the present invention, an information processing apparatus communicable with a peripheral apparatus includes a selection unit configured to accept a selection of a device type to which configuration setting information indicating a function usable on the peripheral apparatus is registered, an identification unit configured to identify the usable function based on the configuration setting information registered to the selected device type, and a display control unit configured to display a print setting screen for accepting a setting operation for the identified function and for not accepting a setting operation for the unidentified function.

Further features of the present disclosure will become apparent from the following description of exemplary embodiments with reference to the attached drawings.

BRIEF DESCRIPTION OF THE DRAWINGS

FIG. 4 is a table illustrating setting information for each "Device Type".

FIGS. 5A, 5B, 5C, and 5D illustrate examples of user interfaces (UIs) displayed in a configuration setting screen.

FIGS. 6A, 6B, 6C, and 6D are tables illustrating setting information of "Paper Size Processing Capabilities".

FIGS. 7A and 7B illustrate examples of UIs displayed in a print setting screen.

FIG. 8A illustrates an example of a UI displayed in the configuration setting screen, and FIG. 8B is a table illustrating an example of setting information of paper size processing capabilities.

FIGS. 13A, 13B, 13C, and 13D illustrate examples of UIs displayed in the configuration setting screen.

DESCRIPTION OF THE EMBODIMENTS

Figure 1:
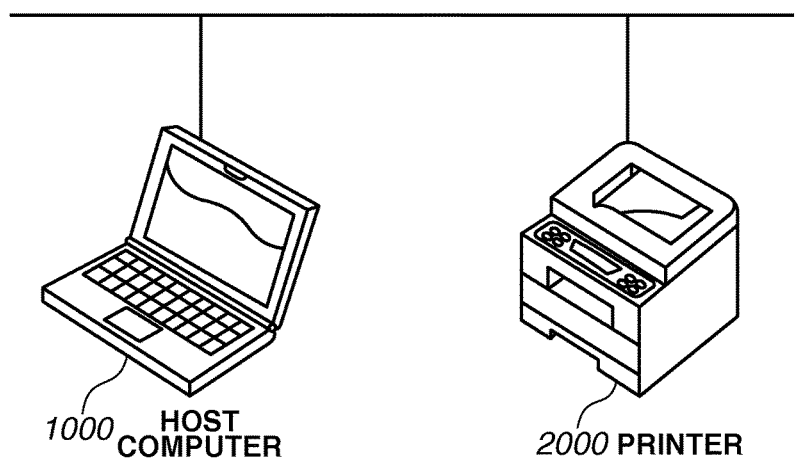
FIG. 1 illustrates a configuration of a printing system according to an exemplary embodiment.

Terms used in the present specification will be defined below.

A "capability" refers to functions usable on a connected printer and is provided as items on a configuration setting screen. For example, if a connected printer is provided with a two-sided printing unit and therefore is capable of performing "Two-Sided Printing", it is said that the printer has a "Two-Sided Printing" capability. In this case, a setting item for the "Two-Sided Printing" capability is displayed on the configuration setting screen described below.

"Configuration setting information" refers to setting information for functions usable on the connected printer. For example, the configuration setting information indicates a usable/unusable status of two-sided printing and a usable/unusable status of a bookbinding printing function. Functions set to be usable in the configuration setting information can be changed in "Print Settings" for each print job. For example, when "Two-Sided Printing" is set to be usable in the configuration setting information (specifically, when the "Two-Sided Printing" capability is set "On" in the configuration setting screen), a user is able to specify a desired printing method ("One-Sided Printing" or "Two-Sided Printing") by using a print setting screen.

A "maximum capability" refers to all pieces of capability which can be supported by the connected printer when an option apparatus is attached thereto.

A "current capability" refers to pieces of capability currently usable on the connected printer via an actually attached option apparatus. The user is able to perform print setting operations within a range of the current capability. The print setting screen is also generated based on the current capability.

A "common capability" refers to pieces of general printer capability, such as two-sided printing and stapling. Generally, a printer of a model made usable when an option apparatus is attached performs a capability setting through a manual setting on the configuration settings screen or through configuration information acquisition from the printer. Configuration information which can be acquired through the configuration information acquisition describes, for example, a printer name and information about options connected to the printer.

A "model specific capability" refers to model-specific fixed functions, and is information which cannot be acquired from the printer. For example, a "Paper Type Processing Method" may be used for fixing mode specification for a certain model, and may be used for paper feed stage selection for another model. The fixing mode refers to a combination of the temperature setting and the sheet-passing speed of a fixing drum. For example, when "Thick Paper" is selected as "Paper Type", processing is performed at a higher fixing temperature and at a lower sheet-passing speed than with "Plain Paper". The paper feed stage selection refers to a function of automatically selecting a paper cassette in which plain paper is stored (when "Plain Paper" is selected) or a paper cassette in which thick paper is stored (when "Thick Paper" is selected). In the print setting screen, "Thick Paper" and "OHP (paper for Over Head Projector)" can be selected as "Paper Type" in any case. However, since processing to be performed is predetermined for each printer, it is necessary to generate a print job (command) suitable for each printer. Another example of the "model specific capability" is a paper size processing capability. The paper size processing capabilities includes the paper size usable for each model, the usable/unusable status of two-sided printing, and stapling positions for each paper size. As described above, the "model specific capability" includes the differences between operations of printers which cannot be set in the configuration information acquisition.

The differences between the "common capability" and the "model specific capability" will be described below. For example, the common capability refers to information which is changed through the configuration information acquisition, and the model specific capability refers to information which is not changed through the configuration information acquisition. As another example, the "common capability" refers to a capability which is not hard-coded in a program of a printer driver, and the "model specific capability" refers to a capability which is hard-coded in the program.

Various exemplary embodiments will be described in detail below with reference to the drawings.

First, a configuration of a print management system according to a first exemplary embodiment is described below.

FIG. 1 illustrates an example of the overall configuration of the print management system according to the first exemplary embodiment. The print management system according to the present exemplary embodiment includes at least a client personal computer (PC) (information processing apparatus) 1000 and a printer (peripheral apparatus) 2000 which are communicably connected to each other.

Unless otherwise stated, the present disclosure is applicable to a single apparatus and a system including a plurality of apparatuses as long as the functions of the present disclosure are executed. Further, unless otherwise stated, the present disclosure is applicable even to a locally connected system and a system connected via a network, such as a local area network (LAN) and a wide area network (WAN), as long as the functions of the present disclosure are executed.

Next, the configurations of the information processing apparatus and the printer according to the present exemplary embodiment will be described below with reference to a block diagram illustrated in FIG. 2. The exemplary embodiment is applicable to a single apparatus, a system including a plurality of apparatuses, and a system connected via a network, such as a LAN and a WAN, as long as the functions of the exemplary embodiment are executed.

Figure 2:
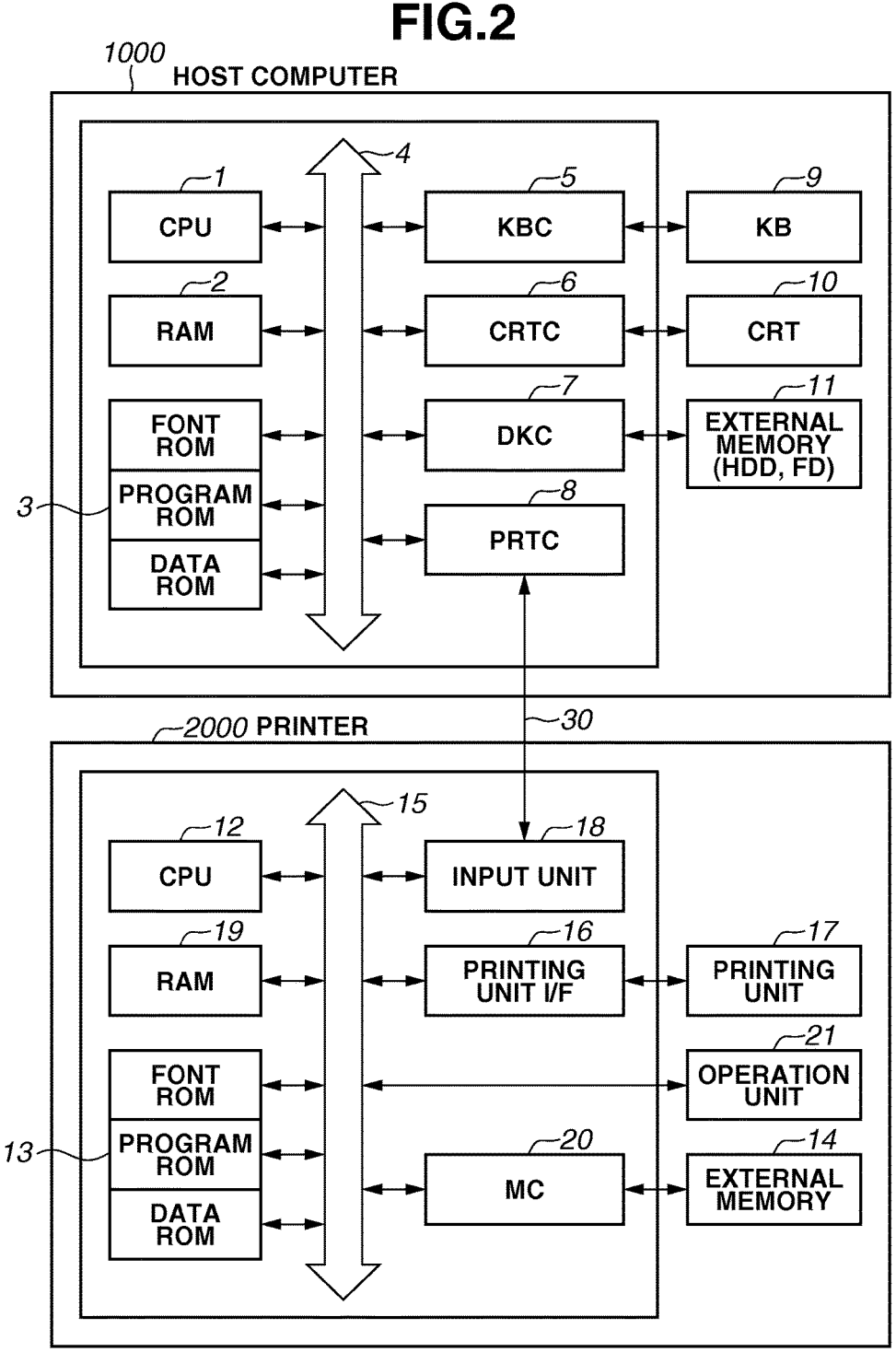
FIG. 2 illustrates an internal configuration of a common printing system.

Referring to FIG. 2, the information processing apparatus (host computer) 1000 includes a central processing unit (CPU) 1 for processing documents and images based on a document processing program stored in a program read only memory (ROM) of a ROM 3 or an external memory 11. The CPU 1 totally controls each printer connected to a system bus 4.

The program ROM of the ROM 3 or the external memory 11 stores an operating system (OS) which is a control program of the CPU 1. A font ROM of the ROM 3 or the external memory 11 stores font data to be used in the above-described document processing. A data ROM of the ROM 3 or the external memory 11 stores various data to be used in the above-described document processing. A random access memory (RAM) 2 functions as a main memory and a work area for the CPU 1.

A keyboard controller (KBC) 5 controls key inputs from a keyboard 9 and a pointing device (not illustrated). A cathode-ray tube controller (CRTC) 6 controls display of a CRT display 10. A disk controller (DKC) 7 controls access to the external memory 11, such as a hard disk drive (HDD), for storing a boot program, various types of applications, font data, and a printer command generation program (hereinafter referred to as a printer driver). A printer controller (PRTC) 8 is connected to a printer 2000 via a bidirectional interface (interface) 30, and performs processing for controlling communication with the printer 2000.

The CPU 1 performs processing for expanding (rasterizing) an outline font, for example, into a display information RAM set on the RAM 2 to achieve "What You See Is What You Get" (WYSIWYG) on the CRT 10. The CPU 1 opens various registered windows based on a command pointed by a mouse cursor (not illustrated) on the CRT 10, and executes various data processing. When performing printing, the user sets print setting information by using the print setting screen related to print settings.

The printer 2000 is controlled by a CPU 12. The CPU 12 of the printer 2000 operates based on a control program stored in a program ROM of a ROM 13 or a control program stored in an external memory 14. The CPU 12 outputs an image signal as output information to a printing unit (printer engine) 17 connected to a system bus 15 via a printing unit interface (I/F) 16. The program ROM of the ROM 13 stores a control program of the CPU 12. A font ROM of the ROM 13 stores font data to be used to generate the above-described output information. A data ROM of the ROM 13 stores information to be used on the host computer 1000 in a case of a printer having no external memory 14, such as a hard disk.

The CPU 12 is capable of communicating with the host computer 1000 via an input unit 18, and notifying the host computer 1000 of information in the printer. A RAM 19 functions as a main memory and a work area for the CPU 12. The memory capacity thereof can be extended by using an option RAM connected to an extension port (not illustrated). The RAM 19 is used as an output information rasterization area, an environmental data storage area, and a nonvolatile RAM (NVRAM). Access to the above-described external memory 14, such as a hard disk drive (HDD) and an integrated circuit (IC) card, is controlled by a memory controller (MC) 20. The external memory 14 is connected as an option, and stores font data, an emulation program, and form data. The input unit 18 is the above-described operation panel having operation switches and light-emitting diode (LED) indicators arranged thereon.

The number of the above-described external memories 14 is not limited to one, and a plurality of the external memories 14 may be provided. A plurality of the external memories 14 storing internal fonts, option cards, and programs for interpreting different printer control language systems may be connected. Further, a NVRAM (not illustrated) may be provided to store printer mode setting information from an operation panel 21.

Processing according to the present exemplary embodiment is implemented when the CPU 1 loads a program stored in the program ROM of the ROM 3 or in the external memory 11 into the RAM 2, and executes it.

Figure 3:
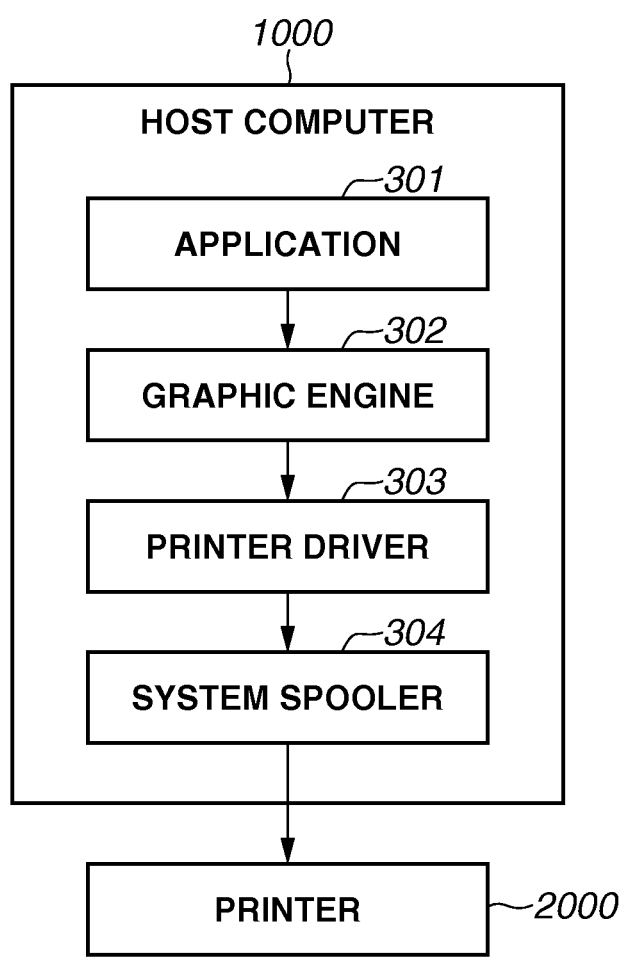
FIG. 3 illustrates a configuration of typical print processing.

Print processing performed by the host computer 1000 will be described below with reference to FIG. 3. An application 301, a graphic engine 302, a printer driver 303, and a system spooler 304 exist as files stored in the external memory 11. These programs are loaded into the RAM 2 and executed by the OS or a module using an OS module. The application 301 and the printer driver 303 can be added to a floppy disk (FD) as the external memory 11, a compact disc read only memory (CD-ROM) (not illustrated), or the HDD as the external memory 11 via a network (not illustrated). The application 301 is loaded into the RAM 2 and executed. When performing printing with the printer 2000, the application 301 outputs (draws) data by using the graphic engine 302 which has been similarly loaded into the RAM 2.

The graphic engine 302 loads the printer driver 303 prepared for each printing apparatus from the external memory 11 into the RAM 2, and sets the output of the application 301 to the printer driver 303. A graphic device interface (GDI) function received from the application 301 is converted into a device driver interface (DDI) function or printing format data, such as extended markup language (XML) paper specification (XPS), and is output to the printer driver 303.

The printer driver 303 generates a control command recognizable by the printer, such as a page description language (PDL) based on data received from the graphic engine 302. One control command set generated from one print request is referred to as a print job. The generated print job is output to the printer 2000 via the system spooler 304 loaded into the RAM 2 by the OS, and via the interface 30.

The following describes processing for uniquely configuring a print setting screen through configuration setting processing even without preparing functional information for each model as a database. Before performing configuration setting processing, the user selects a printer subjected to setting of the configuration setting information by using a port selection screen provided by the OS.

FIG. 5A illustrates an example of a configuration setting screen 500.

A device type 501 is used to collectively convert the configuration setting information. A plurality of options is listed for the device type 501. Details on the options will be described below. An import button 502 of the device type 501 is used to import configuration setting information subjected to collective conversion. Details on such conversion will be described below. The device type may be also referred to as a configuration profile.

Common capabilities 503 include common capabilities 504 to 508. A device type 504 indicates a device type, i.e., a combination of information about the maximum supported paper size (A3 or A4) and information about color (color or monochrome). Stapling 505, two-sided printing 506, bookbinding printing 507, and case bookbinding 508 indicate whether respective functions are usable at the time of printing. FIG. 5A illustrates an example in which all of the four functions are set "Off". Specifically, the maximum capability of the printer selected in the port selection screen includes the stapling, the two-sided printing, the bookbinding printing, and the case bookbinding functions. However, when these functions are not to be used (or when the printer is not provided with these options), the user sets these capabilities Off.

Model specific capabilities 509 include model specific capabilities 510 to 512. Paper type processing method 510 is used to specify, when paper type (plain paper, thick paper, OHP, etc.) is selected, how the set paper type acts on the printer. Options are "None", "Select Paper Feed Stage", and "Set Fixing Temperature". When "Select Paper Feed Stage" is selected, the selected paper type is used to select a paper feed stage. When "Set Fixing Temperature" is selected, the selected paper type is used to set a fixing mode. The printer driver generates a print job by using these settings. In the example illustrated in FIG. 5A, "None" is set.

Paper size processing capabilities 511 include the supported paper size, and, for each paper size, the usable/unusable status of two-sided printing and information for controlling positions at which stapling is possible (hereinafter referred to as stapling positions). FIG. 6A illustrates an example of paper size processing capabilities 511. In this example, the selected printer supports "A4", "A5", and "B5", does not support two-sided printing, and supports only the upper left stapling position for each paper size. The supported paper size, the usable/unusable status of two-sided printing for each paper size, and the stapling positions for each paper size can be edited in an editing screen (not illustrated) which opens when a set details button 512 is pressed.

An acquire configuration information button 513 is used to acquire the configuration information from the printer.

The user presses an OK button 514, a cancel button 515, and an apply (update) button 516 as required to apply and cancel settings.

A processing method for configuring a print setting screen based on the configuration setting information illustrated in FIG. 5A will be described below with reference to a print setting screen 700 illustrated in FIG. 7A.

Paper size 701 accepts a selection of a paper size to be used at the time of printing execution. The paper size 701 illustrated in FIG. 7A lists "A4", "A5", and "B5" according to list information in the table illustrated in FIG. 6A. Paper orientation 702, number of copies 703, and Magnification 704 accept the paper orientation, the number of copies, and the magnification, respectively. Paper type 705 accepts a paper type. Referring to the screen illustrated in FIG. 5A, since "None" is selected as the paper type processing method 510, options 705 to 707 illustrated in FIG. 7A are grayed out, so that a selection from the user is not accepted.

Printing method 706 accepts a printing method ("One-Sided Printing" or "Two-Sided Printing") desired by the user. Options displayed for the printing method 706 depend on the configuration setting information. In addition to "One-Sided Printing", validated printing methods out of the two-sided printing 506, the bookbinding printing 507, and the case bookbinding 508 are listed as options for the printing method 706. Since all capabilities are set Off in the screen illustrated in FIG. 5A, the printing method 706 is fixedly set to "One-Sided Printing", and grayed out, so that a selection from the user is not accepted.

Stapling 707 accepts a stapling position. the stapling 707 depends on the configuration setting information. When the stapling 505 is set On, the stapling 707 is validly indicated so that a selection from the user is accepted. In addition to "None", stapling positions made usable in the table illustrated in FIG. 6A according to the paper size selected as the paper size 701 are listed as options for the stapling 707. Since the stapling 505 is set Off in the screen illustrated in FIG. 5A, the stapling 707 is grayed out, so that a selection from the user is not accepted.

An example of a print setting screen to be configured when another configuration setting information is set will be described below.

In the configuration setting screen 500 illustrated in FIG. 5B, "A3 Color Device" is set as the device type 504, and the stapling 505 to the bookbinding 508 are set On, and "Select Paper Feed Stage" is set as the paper type processing method 510. The contents of the table illustrated in FIG. 6B are set as the paper size processing capabilities 511.

The print setting screen 700 generated based on the configuration setting information is illustrated in FIG. 7B. Options for the paper size 701 include "A3", "A4", "A5", "B4", "B5", "Postcard", and "Envelope" according to the table illustrated in FIG. 6B. Since "Select Paper Feed Stage" is set as the paper type processing method 510, the paper type 705 is validly indicated so that a selection from the user is accepted. Options for the paper type 705 include "Plain Paper", "Thick Paper", and "OHP". Options for the paper type 705 are acquired from, for example, the printer through the configuration information acquisition.

The paper type selected as the paper type 705 is converted into a command suitable for "Select Paper Feed Stage" set as the paper type processing method 510, and a print job is generated. When "Set Fixing Temperature" is selected as the paper type processing method 510, the paper type selected as the paper type 705 is converted into a command for controlling the fixing mode of the printer.

Since the two-sided printing 506 to the bookbinding 508 are set in FIG. 5B, up to four options ("One-Sided Printing", "Two-Sided Printing", "Bookbinding Printing", and "Case Bookbinding Printing") are listed for the printing method 706. The listed options depend on the size selected as the paper size 701 and the contents of the table illustrated in FIG. 6B. For example, when "Envelope" is selected as the paper size 701 in the screen illustrated in FIG. 7B, only "One-Sided Printing" is displayed for the printing method 706 since two-sided printing is not permitted for "Envelope" in the table illustrated in FIG. 6B. On the other hand, when "A4" is selected as the paper size 701 in the screen illustrated FIG. 7B, "One-Sided Printing", "Two-Sided Printing", "Bookbinding Printing", and "Case Bookbinding Printing" are listed for the printing method 706 since all printing methods are permitted for "A4" in the table illustrated in FIG. 6B.

Stapling positions for the size selected as the paper size 701 are listed for the stapling 707. Referring to the screen illustrated in FIG. 7B, "None", "Upper Right", "Upper Left", "Short Side Double", and "Long Side Double" are listed for the stapling 707 with reference to the capability for "A4" in the table illustrated in FIG. 6B.

As described above, performing configuration setting processing enables uniquely configuring the print setting screen 700 applicable to any desired printer. Specifically, if the capability is appropriately set in configuration setting processing, a suitable print setting environment can be provided even for a printer with unknown specifications scheduled to be on the market.

However, it is very difficult for the user to manually set each printer capability, especially the model specific capability. Accordingly, there is a collective change function for easily setting the configuration setting information of a printer, its series or its category. The collective change function will be described below.

As described above, the user firstly selects a printer subjected to a setting of the configuration setting information, for example, by using a port selection screen provided by the operating system. The user selects a printer, and then changes the device type 501 illustrated in FIG. 5A. In the above-described user operations, the configuration setting information of the selected device type 501 is applied as the configuration setting information of the printer selected in the port selection screen. As a result, the print setting screen 700 for the printer selected in the port selection screen is generated based on the configuration setting information for the device type 501.

Setting values at the time of collective change will be described below. FIG. 4 illustrates a list of the configuration setting information for each device type. A capability No. 401 is a number assigned to each capability. A capability 402 indicates the name of a capability and corresponds to each of the capabilities in the screen illustrated in FIG. 5A. A model specific capability 403 indicates whether a capability is a model specific capability. For example, "Device Type" is not a model specific capability since "No" is described, and "Paper Type Processing Method" is a model specific capability since "Yes" is described. A standard 404 to an Anywhere Print 407 are options listed for the device type 501, and are setting information given to each capability No. The setting information includes the maximum capability, the current capability, and the model specific capability. The device types which can be provided include device types applicable to each model, device types applicable on a general-purpose basis to each model series and category, device types applicable to a specific use case and scenario. A standard 404 is applied by default to the screen illustrated in FIG. 5A.

Processing of collective change will be described below with reference to the flowchart illustrated in FIG. 9. Steps of each flowchart of the present specification is implemented when the CPU reads and executes a program related to each flowchart.

Figure 9:
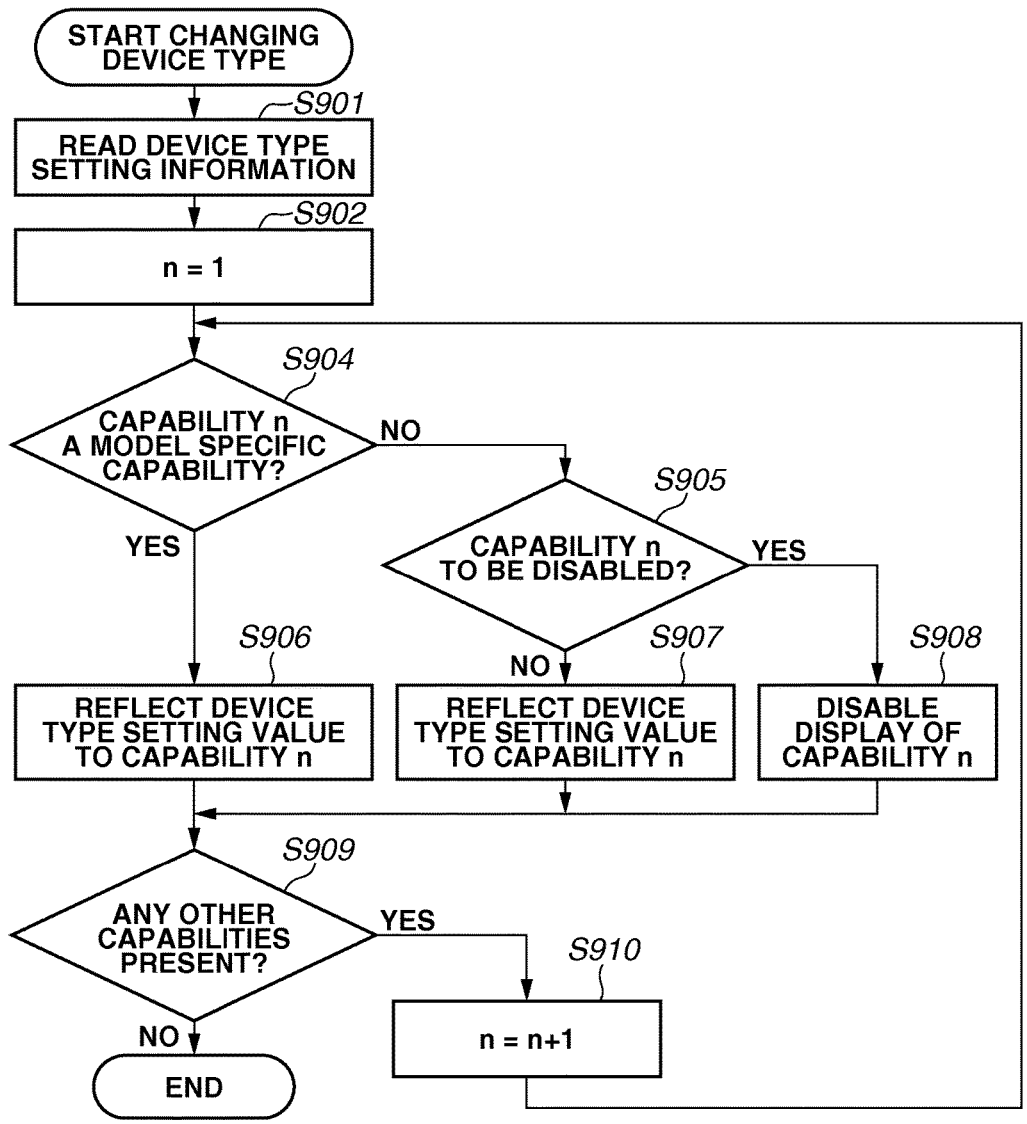
FIG. 9 is a flowchart illustrating processing performed when a device type is selected.

Processing of the flowchart illustrated in FIG. 9 starts when the user changes the option currently listed for the device type 501 illustrated in FIG. 5A.

In step S901, the printer driver 303 reads setting information corresponding to the selected device type, and sets the variable n for capability reference to "1".

In step S904, the printer driver 303 determines whether the capability of the capability No. n (capability n) is a model specific capability. The determination in step S904 is performed by referring to the model specific capability 403 in the table illustrated in FIG. 4. When the capability n is determined to be a model specific capability (YES in step S904), then in step S906, the printer driver 303 reflects to the capability n in the configuration setting screen 500 the setting value of the relevant capability out of the setting information of the device type read in step S901.

On the other hand, when the capability n is determined to be not a model specific capability (NO in step S904), then in step S905, the printer driver 303 determines whether the capability n is to be disabled. The determination in step S905 is performed by referring to the setting value of the relevant capability out of the setting information of the device type read in step S901. When "Disabled" is set for the relevant capability, the result of the determination is "YES". When "Hide" is set instead of "Disabled", the result of the determination is similarly "YES". When the capability n is determined not to be disabled (NO in step S905), then in step S907, the printer driver 303 reflects to the capability n in the configuration setting screen 500 the setting value of the relevant capability out of the setting information of the device type read in step S901. On the other hand, when the capability n is determined to be disabled (YES in step S905), then in step S908, the printer driver 303 grays out the items corresponding to the capability n in the configuration setting screen 500.

In step S909, the printer driver 303 determines whether any other capabilities exist. When any other capabilities are determined to exist (YES in step S909), then in step S910, the printer driver 303 increments the capability No. n by 1. Then, the processing returns to step S904. The printer driver 303 performs similar processing on the following capability. When any other capabilities are determined not to exist (NO in step S909), the relevant processing is completed for all capabilities. Then, the processing ends this flowchart.

When the user changes the device type 501 from "Standard" to "MFP-xxxSeries", the configuration setting screen 500 illustrated in FIG. 5A is changed to the one illustrated in FIG. 5C. Processing in the flowchart illustrated in FIG. 9 in this case will be changed as follows.

In step S901, the printer driver 303 reads the setting information of an MFP-xxxSeries 405 in the table illustrated in FIG. 4. For "A3 Color" of the capability No. 1, the printer driver 303 determines that the capability n is not a model specific capability (NO in step S904), determines that the capability n is not to be disabled (NO in step S905), and sets "A3 Color" as the device type 504 corresponding to the capability 1 in the configuration setting screen 500 in step S907. For "Stapling" of the capability No. 2, the printer driver 303 determines that the capability n is not a model specific capability (NO in step S904), determines that the capability n is not to be disabled (NO in step S905), and sets the stapling 505 of the capability 2 On in the configuration setting screen 500 in step S907. For "Case Bookbinding" of the capability No. 5, the printer driver 303 determines that the capability n is not a model specific capability (NO in step S904), and determines that the capability n is to be disabled (YES in step S905). Then, the relevant capability is grayed out as indicated in step S908. For "Paper Type Processing Method" of the capability No. 6, the printer driver 303 determines that the capability n is a model specific capability (YES in step S904), and sets "Select Paper Feed Stage" in step S906. The printer driver 303 performs similar processing for other capabilities. For "Paper Size Processing Capabilities" of the capability No. 7, the table illustrated in FIG. 6C is related with the configuration setting screen 500 in step S906, and configuration setting processing is eventually completed as illustrated in FIG. 5C.

In another example, when the device type 501 is changed from "Standard" to "SFP-xxxSeries" in the screen illustrated in FIG. 5A, the setting information of the SFP-xxxSeries 406 in the table illustrated in FIG. 4 is used, and configuration setting processing is performed through similar processing as illustrated in FIG. 5D. In this case, for "Paper Size Processing Capabilities", the table illustrated in FIG. 6D is related with the configuration setting screen 500 illustrated in FIG. 5D.

As described above, the user is able to easily perform configuration setting processing by selecting a device type in the configuration setting screen 500. Thus, the user is able to easily perform configuration setting processing also for a printer with unknown specifications simply by manually changing only the difference between the settings of configuration setting processing and the capability of the printer. Specifically, the user is able to easily set the configuration setting information also for a printer scheduled to be on the market. Although, in the present exemplary embodiment, the device type corresponds to a printer series, the device type is not limited thereto, and may correspond to each individual printer more minutely or to printer categories more widely.

Although, in the first exemplary embodiment, either "Disabled" or a setting value is specified for each common capability in the device type setting information in the table illustrated in FIG. 4, both may be specified at the same time. For example, when "Disabled" and "On" are described at the same time, the relevant capability is fixedly set On and becomes unchangeable.

Although not described in the first exemplary embodiment, a function of importing a device type may be provided. This function imports a file of the device type generated by other users. For example, the user selects an external file and presses the import 502 button in the screen illustrated in FIG. 5A to import the file. The imported device type is appended to the device type 501. This method enables providing the configuration setting information for a new printer as an external file. For example, when a user purchases a printer with a specific option mounted, the user is provided with a device type suitable for the relevant option configuration. Thus, the user is able to perform optimal configuration setting processing simply by importing and selecting an external device type. Further, there may be provided with an export function (not illustrated) for outputting as an external file the configuration setting information set on the configuration setting screen 500.

Although, in the first exemplary embodiment, an unusable function is grayed out, it may be hidden.

In the first exemplary embodiment, a method for easily implementing configuration setting processing by using a device type has been described.

However, depending on the degree of user's knowledge about printers, device type selection itself may be difficult.

In a second exemplary embodiment, therefore, a device type is firstly determined and applied based on the configuration information (also referred to as apparatus information) acquired from a printer, and then capabilities acquired through such configuration information acquisition is updated.

This processing flow will be described below with reference to the flowchart illustrated in FIG. 10.

Figure 10:
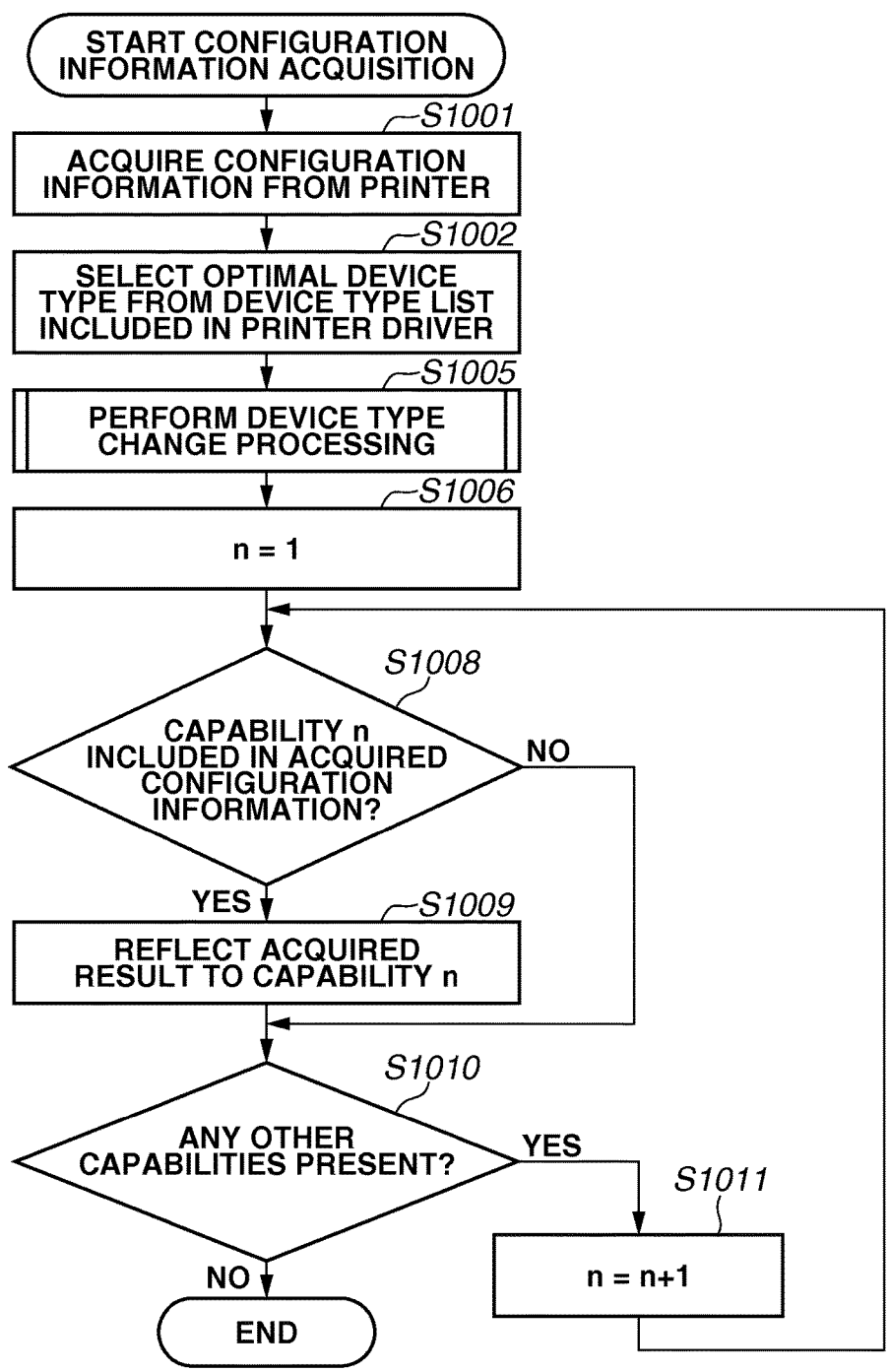
FIG. 10 is a flowchart illustrating processing for performing configuration information acquisition.

Processing of the flowchart illustrated in FIG. 10 starts when the user presses the acquire configuration information button 513 illustrated in FIG. 5A. In step S1001, the printer driver 303 acquires the configuration information from the printer.

In step S1002, based on the acquired configuration information, the printer driver 303 selects an optimal device type from the device types in the table illustrated in FIG. 4. The printer driver 303 may determine the optimal device type by using information for directly determining the device type, such as the model name, or by comparing the maximum capability for each device type in the table illustrated in FIG. 4 with the acquired configuration information and selecting a closest one. An example of processing for comparing the maximum capability for each device type in the table illustrated in FIG. 4 with the acquired configuration information will be described below. For example, suppose a case where the stapling, the two-sided printing, and the bookbinding printing functions are described in the acquired configuration information as printer functions. When the above-described configuration information is acquired, there are 2 matched capabilities both for the MFP-xxxSeries 405 and the Anywhere Print 407. However, "Off" is described for the bookbinding printing function of the MFP-xxxSeries 405. The bookbinding printing function set as Off is validated when the user sets "Bookbinding Printing" On in the configuration setting screen 500. On the other hand, "Disabled" is described for the bookbinding printing function of the Anywhere Print 407. Specifically, the user is not able to set it On in the configuration setting screen 500. Therefore, when comparison is made by using the maximum capability, there are 3 matched capabilities for the MFP-xxxSeries 405 and 2 matched capabilities for the Anywhere Print 407. Therefore, when the above-described configuration information is acquired, the printer driver 303 selects the MFP-xxxSeries 405.

In step S1005, the printer driver 303 collectively converts the configuration setting information by using the device type selected in step S1002. Processing for the collective conversion is similar to the processing of the flowchart illustrated in FIG. 9.

In step S1006, the printer driver 303 sets the capability No. n to "1". The capability No. n corresponds to the capability No. 401 in the table illustrated in FIG. 4.

In step S1008, the printer driver 303 determines whether the capability corresponding to the capability No. n is included in the acquired configuration information. When the capability corresponding to the capability No. n is determined to be included in the acquired configuration information (YES in step S1008), then in step S1009, the printer driver 303 updates display of the relevant capability in the configuration setting screen 500 with the value of the acquired configuration information. For example, with reference to the above-described example, "Bookbinding Printing" is set Off for the selected MFP-xxxSeries 405. On the other hand, the acquired configuration information describes that the bookbinding printing function is usable. Specifically, since the capability corresponding to the capability No. n is included in the acquired configuration information (YES in step S1008), then in step S1009, the printer driver 303 sets "Bookbinding Printing" On in the configuration setting screen 500. Different processing in steps S1008 to S1009 will be described below. For example, for the MFP-xxxSeries 405, "Disabled" is described for the case bookbinding function. Even if the acquired configuration information describes that the case bookbinding function is described to be usable, the printer driver 303 does not display "Bookbinding" in the configuration setting screen 500 since the case bookbinding function is forbidden for the selected MFP-xxxSeries 405. Therefore, setting a piece of the configuration setting information Off is also referred to as "invalidated", and setting it "Disabled" is also referred to as "forbidden". In the above-described processing, when a predetermined function is invalidated in the configuration setting information registered to the device type that has been selected based on the configuration information, and the configuration information indicates that the above-described predetermined function is usable, the printer driver 303 identifies the predetermined function as a usable function. On the other hand, when the capability corresponding to the capability No. n is determined to be not included in the acquired configuration information (NO in step S1008), the processing proceeds to step S1010. In this case, the printer driver 303 does not update display of the configuration setting screen 500.

In step S1010, the printer driver 303 determines whether any other capabilities exist. When any other capabilities are determined not to exist (NO in step S1010), the processing ends the flowchart. On the other hand, when any other capabilities are determined to exist (YES in step S1010), then in step S1011, the printer driver 303 increments the capability No. n by 1. Then, the processing repeats step S1008 and subsequent steps.

Although, in this example, the printer driver 303 does not change display when the capability corresponding to the capability No. n is determined to be not included in the acquired configuration information (NO in step S1008), the processing is not limited thereto. The printer driver 303 may assign a default setting, i.e., the setting value of the standard 404 illustrated in FIG. 4.

As described above, performing the configuration information acquisition enables automatically selecting a device type. Further, the printer driver 303 can update the configuration setting information set for the device type, by using the acquired configuration information. Accordingly, the user is able to set the configuration setting information of the printer in an easier way than in the first exemplary embodiment, thus improving user-friendliness. Further, since the device type is selected and then the maximum capability is reflected, the user is able to easily recognize an operable range even when the manual setting is required, thus improving usability.

In the second exemplary embodiment, device type selection is automatically performed through the configuration information acquisition. However, on the other hand, there is a use case where the user does not want to automatically change the device type.

For example, there is a system in which the user once reserves a print job in a server, and accesses the server by using an operation panel of a desired printer from any printer connected to the server, acquires the reserved print job from the server, and performs printing. Hereinafter, this system is referred to as an AnywherePrint function. Although, in this system, there are many cases where a print server is placed, a main printer out of a plurality of printers may serve as a server. In this case, the printer driver 303 is connected to the main printer via a network, a print job is reserved in a storage of the main printer, and the main printer transfers the print job to a sub printer as required. In such a case, if the printer driver 303 acquires the configuration information, the configuration information of the main printer is acquired. However, if the capability of the sub printer is lower than that of the main printer, functions set by the printer driver 303 (for example, the bookbinding printing function) cannot always be achieved by the sub printer. Specifically, a print product based on user-set print setting information may not be output.

When preparing for the above-described case, the user needs to set the current capability which can be output to any printer in configuration setting processing of the printer driver 303. Accordingly, if a device type having the setting information which can be output to any printer is made selectable, the user is able to easily perform configuration setting processing corresponding to the AnywherePrint system.

However, in the second exemplary embodiment, the device type is automatically selected according to the acquired configuration information. Although failure to acquire the configuration information may be considered, there is a case where the configuration information is required to grasp mounted options.

Accordingly, in the present exemplary embodiment, when the user intentionally selects a device type, the device type is not changed based on the acquired configuration information, and the capability for reflecting the result of the configuration information acquisition also follows the maximum capability of the device type. The processing will be described below with reference to the flowchart illustrated in FIG. 11.

Figure 11:
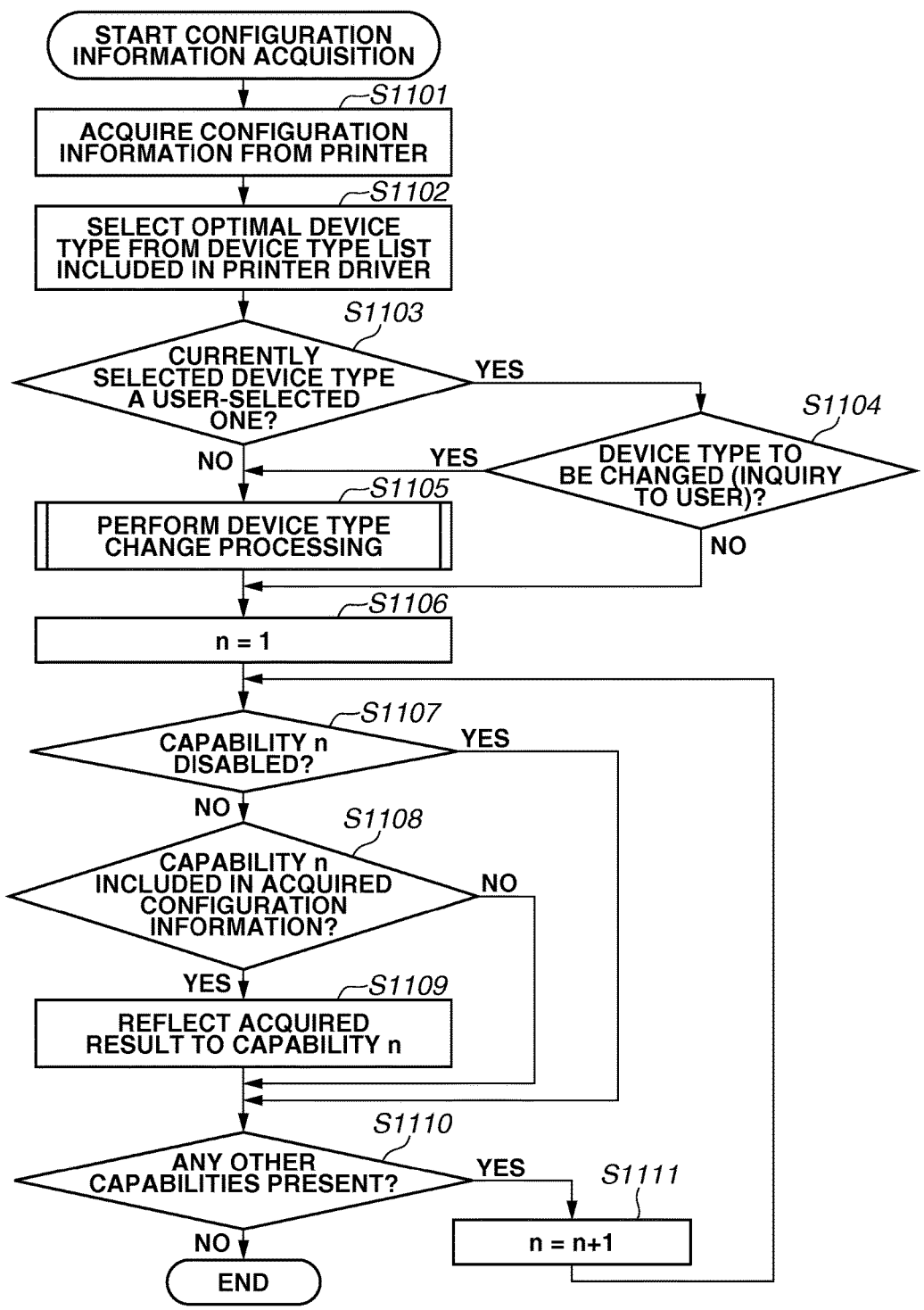
FIG. 11 is a flowchart illustrating processing for performing configuration information acquisition.

Processing of the flowchart illustrated in FIG. 11 starts when the user presses the acquire configuration information button 513 illustrated in FIG. 5A. Processing in steps S1101 to S1102 is similar to processing in steps S1001 to S1002 illustrated in FIG. 10.

In step S1103, the printer driver 303 determines whether the currently selected device type is a device type selected by the user. If the user has changed the device type prior to the determination, the printer driver 303 stores the relevant information (such as a flag). When the currently selected device type is determined to be not a device type selected by the user (NO in step S1103), i.e., when the currently selected device type is a device type changed at the time of the configuration information acquisition, then in step S1105, the printer driver 303 automatically changes the device type. When the currently selected device type is determined to be a device type selected by the user (YES in step S1103), i.e., when the user has changed the device type, then in step S1104, the printer driver 303 makes an inquiry to the user about whether the device type is to be automatically changed. When the device type is specified to be automatically changed (YES in step S1104), then in step S1105, the printer driver 303 automatically changes the device type. On the other hand, when the device type is specified not to be automatically changed (NO in step S1104), the processing proceeds to step S1106. In this case, the printer driver 303 does not change the device type.

Processing in steps S1105 to S1106 is similar to processing in steps S1005 to S1006 illustrated in FIG. 10.

In step S1107, the printer driver 303 determines whether "Disable" is described for the capability of the capability No. n. The printer driver 303 can perform such determination based on the setting value of the capability n included in the device type setting information in the table illustrated in FIG. 4. When the capability of the capability No. n is determined to be disabled (YES in step S1107), the processing proceeds to step S1110. In this case, the printer driver 303 does not change the settings on the configuration setting screen 500. When the capability of the capability No. n is determined to be not disabled (NO in step S1107), then in step S1108, the printer driver 303 determines whether the capability corresponding to the capability No. n is included in the acquired configuration information. Processing in steps S1108 to S1111 is similar to processing in steps S1008 to S1011 illustrated in FIG. 10.

The flowchart illustrated in FIG. 11 will be described below based on an example in which "Anywhere Print" is selected as the device type 501 in the "Standard" condition in the screen illustrated in FIG. 5A. In this case, according to the flowchart illustrated in FIG. 9, the setting information of the Anywhere Print 407 in the table illustrated in FIG. 4 is applied, and the result of configuration setting processing illustrated in FIGS. 8A and 8B is obtained. Referring to the screen illustrated in FIG. 8A, "Bookbinding Printing" and "Case Bookbinding" are grayed out as the maximum capability. When the configuration information is acquired, the printer driver 303 determines that the currently selected device type is a device type selected by the user (YES in step S1103). When the device type is specified not to be automatically changed (NO in step S1104), the processing proceeds to step S1106. In this case, the printer driver 303 does not automatically change the device type. In the setting information for the Anywhere Print 407 in the table illustrated in FIG. 4, "Disabled" is described for the "bookbinding printing" function of the capability No. 4. Therefore, regardless of whether the configuration information acquisition is performed or not, the printer driver 303 skips the reflection of the "bookbinding printing" function to the configuration setting information depending on the result of the determination in step S1107.

As described above, even when the configuration information is acquired after the user intentionally selects a device type, the printer driver 303 performs configuration setting processing within the maximum capability defined therein, giving priority to the device type selected by the user.

The processing enables solving the problem that a print product based on the user-set print setting information is not output, as described at the beginning of the present exemplary embodiment.

In the first to the third exemplary embodiments, configuration setting processing is performed through the selection of a device type. However, when a device type is imported or exported via a file, a problem of version management arises.

For example, suppose a case where the printer driver 303 is upgraded resulting in increased number of capabilities to be handled. This is equivalent to a case where capability No. 8 and subsequent numbers are appended to the table illustrated in FIG. 4. However, since the existing device type information includes only information of up to capability No. 7, the printer driver 303 cannot control the capability of capability No. 8 and subsequent numbers when a device type is selected. Specifically, according to the above-described exemplary embodiments, it is not possible to change setting values or specify "Disable" for the capability of capability No. 8 and subsequent numbers. Therefore, regardless of the selected device type, i.e., regardless of the printer model, the relevant capability can be constantly made usable in the print setting screen 700. This may degrade user-friendliness from the viewpoint of easily performing setting suitable for each printer.

In the present exemplary embodiment, therefore, when selecting a device type and applying each capability value, a version of the printer driver 303 is compared with a version of the device type, and capabilities newer than the version of the device type are invalidated.

The processing flow will be described below with reference to the flowchart illustrated in FIG. 12.

Figure 12:
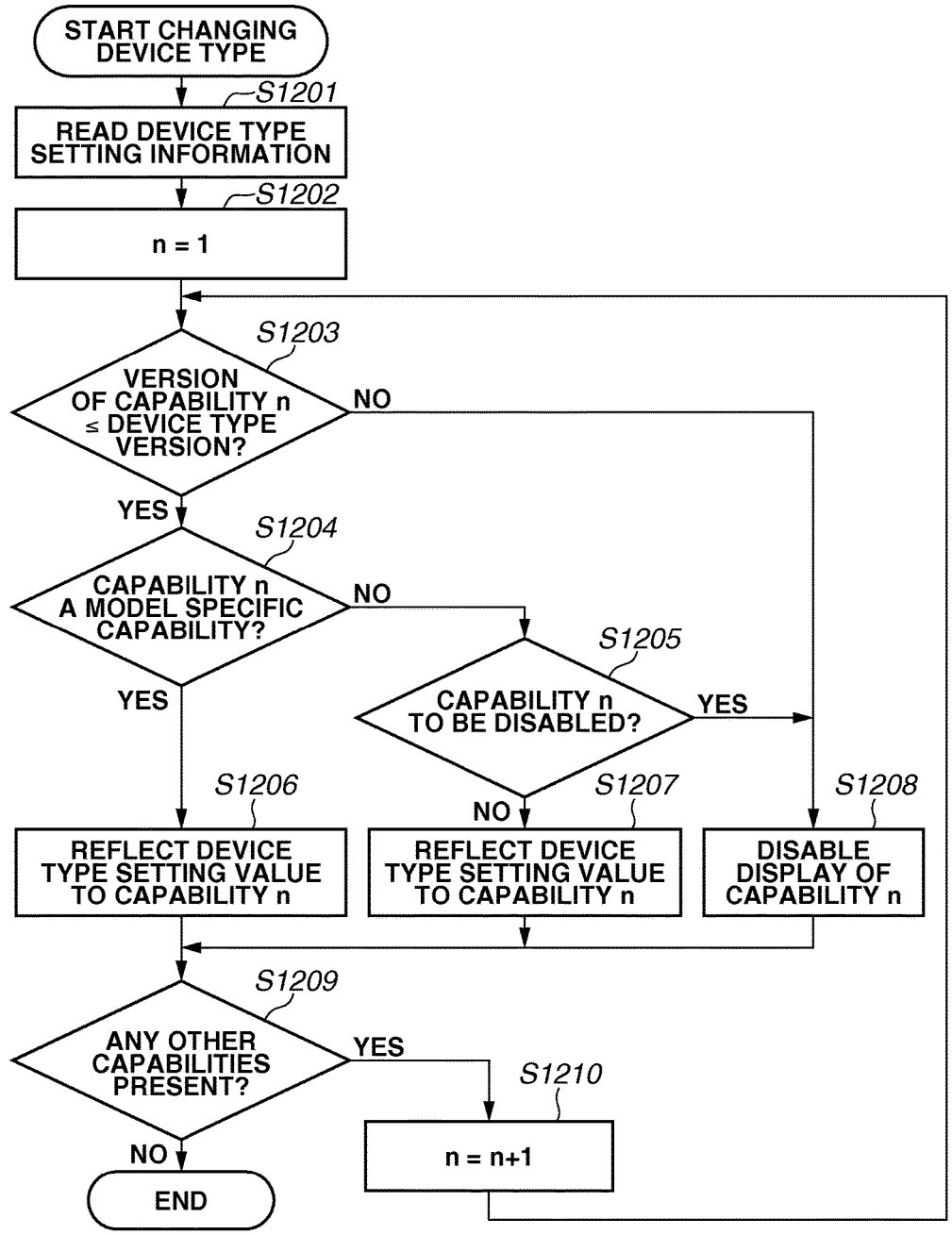
FIG. 12 is a flowchart illustrating processing performed when a device type is selected.

Processing of the flowchart illustrated in FIG. 12 starts when the user changes the device type 501 illustrated in FIG. 5A.

Processing in steps S1201 to S1202 is similar to processing in steps S901 to S902 illustrated in FIG. 9.

In step S1203, the printer driver 303 determines whether an attribute value of the version of the capability of the capability No. n is equal to or smaller than an attribute value of the version included in the selected device type, i.e., whether the capability n is supported by the selected device type. When the capability n is determined to be not supported by the selected device type (NO in step S1203), then in step S1208, the printer driver 303 grays out the relevant capability in the configuration setting screen 500 to make it forbidden. On the other hand, when the capability n is determined to be supported by the selected device type (YES in step S1203), then in step S1204, the printer driver 303 continues processing of the relevant capability similar to the example illustrated in FIG. 9.

Processing in steps S1204 to S1210 is similar to processing in steps S904 to S910 illustrated in FIG. 9.

As described above, in the present exemplary embodiment, the version of each capability included in the printer driver 303 is compared with the version of the device type, and a usable capability is controlled. Then, the user is able to avoid a situation where an unusable function can be seen, thus improving user-friendliness.

Although, in the present specification, the first to the fourth exemplary embodiments have been described above with reference to the screens illustrated in FIGS. 5A to 5D as the configuration setting screen 500, the screen is not limited thereto. Other screens may be used as long as similar processing can be implemented. Other examples of the configuration setting screen will be described below with reference to FIGS. 13A to 13D.

Figure 13A:
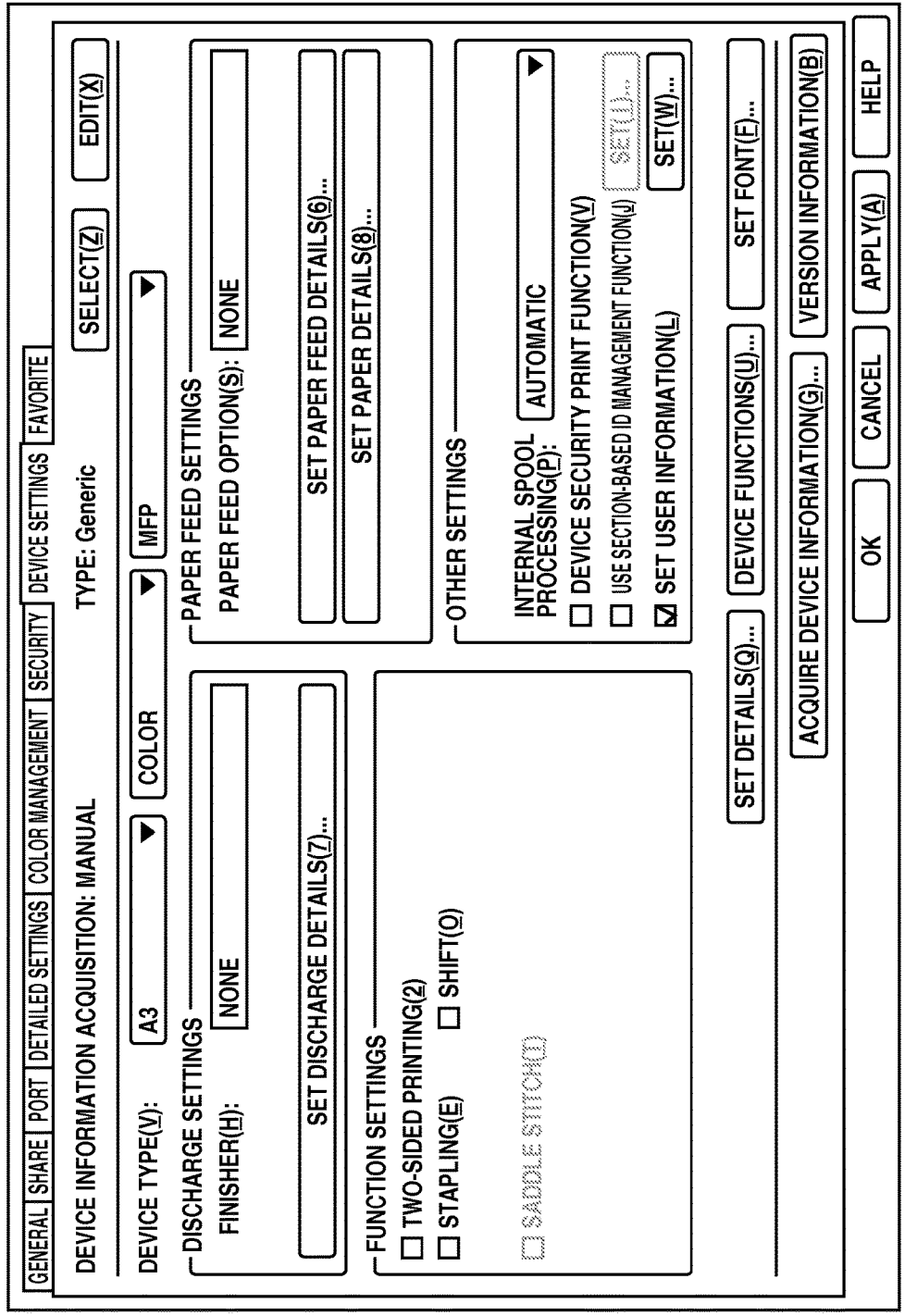
Figure 13B:
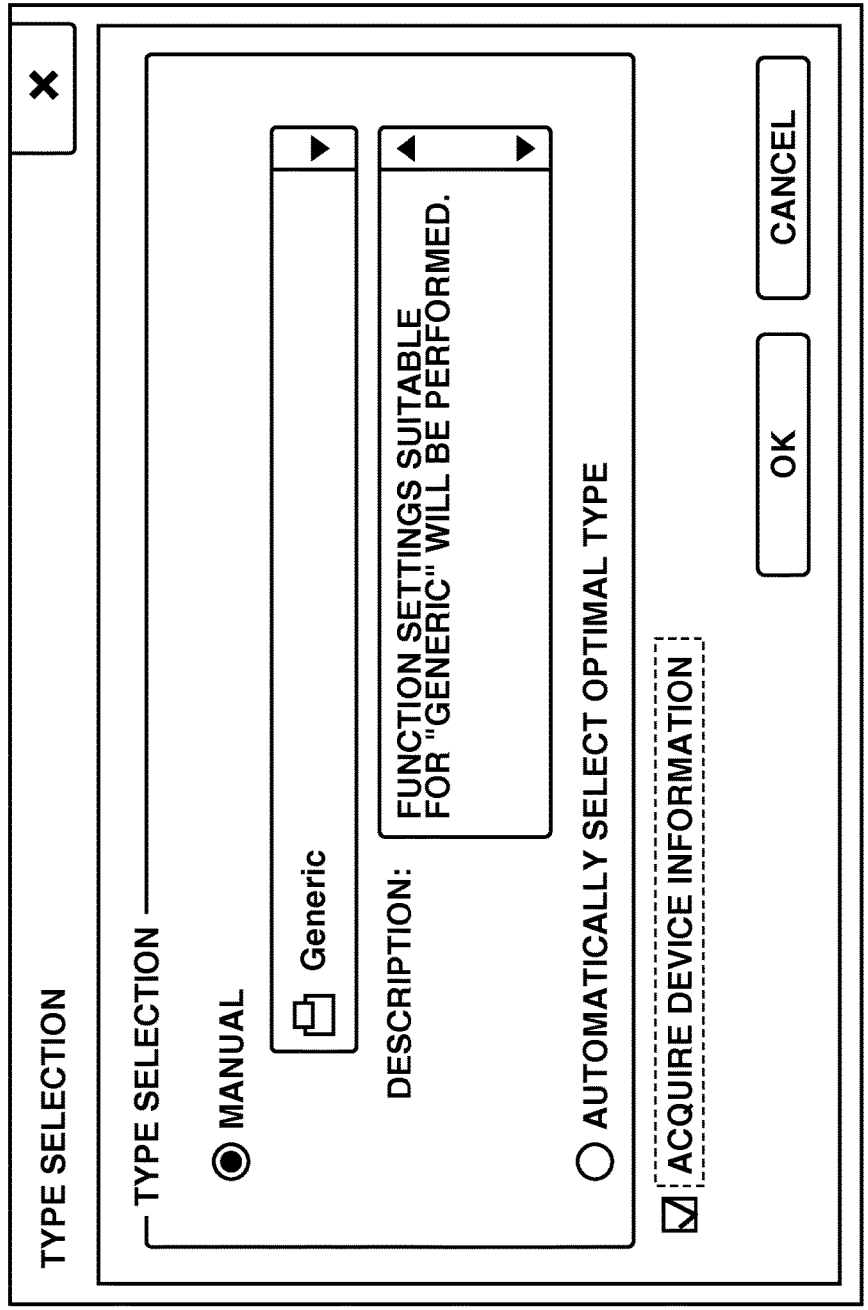
Figure 13D:
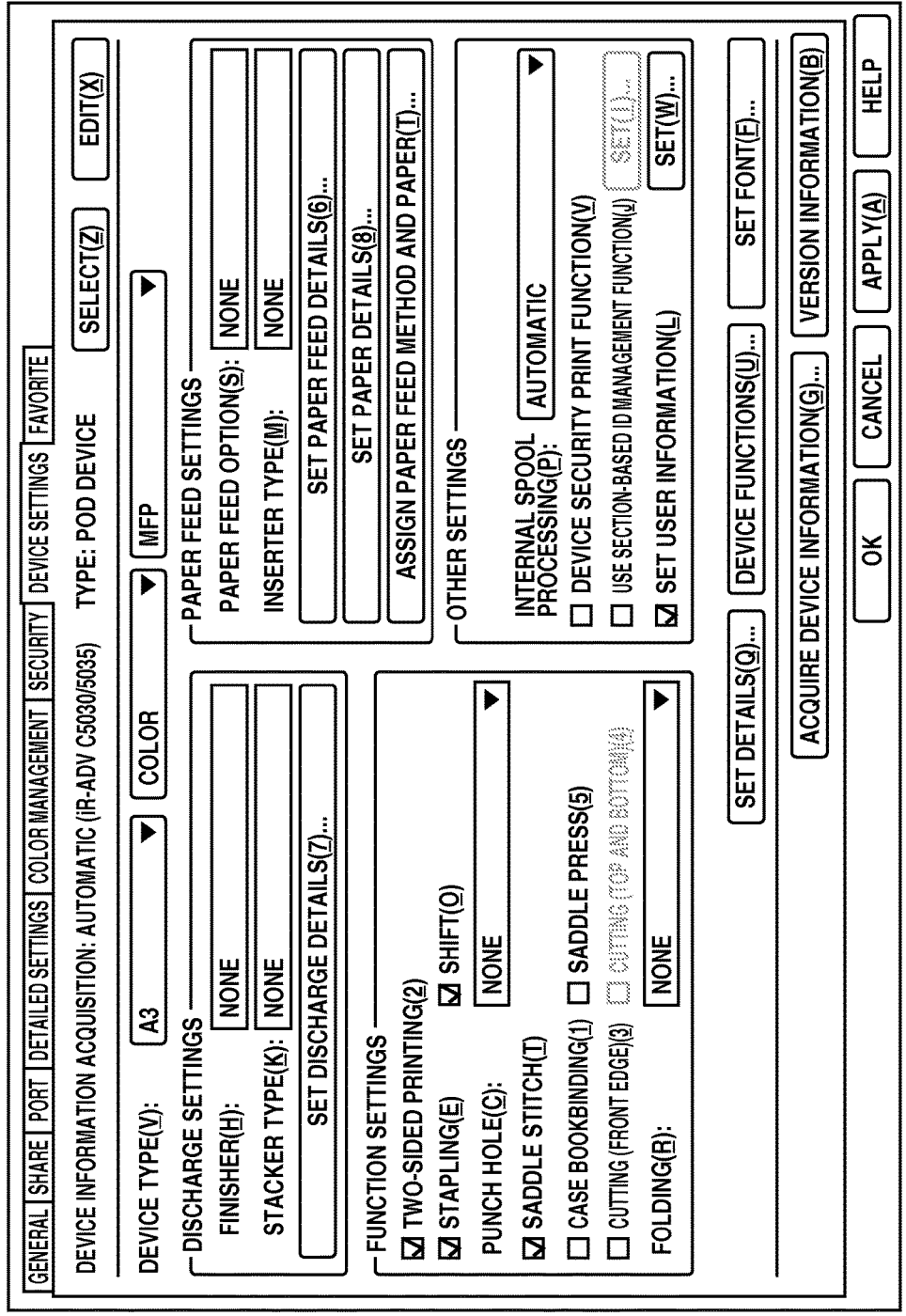

FIG. 13A illustrates a configuration setting screen that is displayed when "Generic" is selected as a device type. For the device type of "Generic", for example, "Two-Sided Printing", "Stapling", and "Shift" are set Off as configuration setting information. Therefore, in the screen illustrated in FIG. 13A, these capabilities are displayed, but the relevant check boxes are set Off. Referring to the screen illustrated in FIG. 13A, "Saddle Stitch" is invalidated since "Stapling" is set Off. When the user presses a select button in the screen illustrated in FIG. 13A, a type selection screen illustrated in FIG. 13B is displayed. In the type selection screen, when the user selects "Manual", selects "Print On Demand (POD) Device" as the device type, sets "Device Information Acquisition" Off, and presses an OK button, the screen illustrated in FIG. 13C is displayed. For the device type of "POD Device", for example, "Two-Sided Printing" is set On, and "Stapling" and "Shift" are set Off as configuration setting information. Therefore, the screen illustrated in FIG. 13C is displayed. On the other hand, when the user selects "Manual" in the "Type Selection" screen, selects "POD Device" as the device type, sets "Device Information Acquisition" On, and presses the OK button, the screen illustrated in FIG. 13D is displayed. This screen is displayed since the configuration information acquired from the selected printer includes information that the two-sided printing, the stapling, the shift, and the saddle stitch functions are executable. Further, when the user selects "Automatically Select Optimal Type" in the type selection screen, other radio buttons, pull-down options, and check boxes are invalidated. Then, when the user presses the OK button, the processing described in the second exemplary embodiment (processing for automatically selecting a device type based on the acquired configuration information) is performed.

According to the present specification, the printer driver performs display control of the print setting screen based on the configuration setting information of the selected device type. Then, based on the print setting information set in the displayed print setting screen and drawing data from the application, the printer driver generates a print job and transmits it to the selected printer.

The present disclosure is implemented also by performing the following processing.

Specifically, software (program) implementing the functions of the above-described exemplary embodiments is supplied to the system or apparatus via a network or various storage media, and a computer (or CPU, micro processing unit (MPU), etc.) of the system or apparatus reads and executes the program.

According to the above-described exemplary embodiments, it becomes possible to display a screen suitable for a printer.

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2013-240036 filed Nov. 20, 2013, which is hereby incorporated by reference herein in its entirety.

What is claimed is:

1. An information processing apparatus communicable with a printing apparatus, the information processing apparatus comprising:

a processor; and a memory storing a program which, when executed by the processor, causes the information processing apparatus to:

register a plurality of types of printing apparatuses and functional information of the printing apparatus for each of the types of printing apparatuses;

acquire apparatus information of a printing apparatus, from the printing apparatus;

determine a type of the printing apparatus of which the apparatus information has been acquired, based on the registered plurality of types of printing apparatuses, using the acquired apparatus information of the printing apparatus;

identify a function of the printing apparatus registered based on the type of the printing apparatus determined;

display a configuration setting screen for setting configuration setting information that is setting information about a function usable in the printing apparatus based on the identified function of the printing apparatus; and display a print setting screen via the configuration setting screen based on the set configuration setting information, wherein the configuration setting screen is displayed in such a way that the function usable in the printing apparatus based on the identified function of the printing apparatus is settable, wherein the configuration setting screen includes a setting object for setting the settable function on or off, and wherein, when device information of the printing apparatus is acquired, on or off of the settable function in the setting object included in the configuration setting screen is automatically set on a basis of the device information of the printing apparatus.

2. The information processing apparatus according to claim 1, wherein, in a case where a predetermined function is invalidated in the functional information of the printing apparatus registered to the type of the printing apparatus determined based on the apparatus information, and where the apparatus information indicates that the predetermined function is usable, the predetermined function is identified as a usable function.

3. The information processing apparatus according to claim 1, wherein a version of a device type is compared with a version of each capability of a printer driver, and a printer driver capability newer than the version of the device type is displayed such that the capability cannot be selected by a user.

4. The information processing apparatus according to claim 1, wherein the type of the printing apparatus is a model type of a printing apparatus and
wherein a plurality of model types of printing apparatus and functional information of the printing apparatus for each of the model types of printing apparatus are registered.

5. A control method executed by an information processing apparatus communicable with a printing apparatus, the method comprising:
registering a plurality of types of printing apparatuses and functional information of the printing apparatus for each of the types of printing apparatuses;
acquiring apparatus information of a printing apparatus, from the printing apparatus;
determining a type of the printing apparatus of which the apparatus information has been acquired, based on the registered plurality of types of printing apparatuses, using the acquired apparatus information of the printing apparatus;
identifying a function of the printing apparatus registered by the registering based on the type of the printing apparatus determined by the determining; and
displaying a configuration setting screen for setting configuration setting information that is setting information about a function usable in the printing apparatus based on the identified function of the printing apparatus; and
displaying a print setting screen via the configuration setting screen based on the set configuration setting information,
wherein the configuration setting screen is displayed in such a way that the function usable in the printing apparatus based on the identified function of the printing apparatus is settable,
wherein the configuration setting screen includes a setting object for setting the settable function on or off, and
wherein, when device information of the printing apparatus is acquired, on or off of the settable function in the setting object included in the configuration setting screen is automatically set on a basis of the device information of the printing apparatus.

6. The information processing apparatus according to claim 5, wherein the type of the printing apparatus is a model type of a printing apparatus and
wherein the registering registers register a plurality of model types of printing apparatus and functional information of the printing apparatus for each of the model types of printing apparatus.

7. A non-transitory storage medium storing computer executable instructions executed by an information processing apparatus communicable with a printing apparatus, the instructions comprising:
registering a plurality of types of printing apparatuses and functional information of the printing apparatus for each of the types of printing apparatuses;
acquiring apparatus information of a printing apparatus, from the printing apparatus;
determining a type of the printing apparatus of which the apparatus information has been acquired, based on the registered plurality of types of printing apparatuses, using the acquired apparatus information of the printing apparatus;
identifying a function of the printing apparatus registered by the registering based on the type of the printing apparatus determined by the determining; and
displaying a configuration setting screen for setting configuration setting information that is setting information about a function usable in the printing apparatus based on the identified function of the printing apparatus; and
displaying a print setting screen via the configuration setting screen based on the set configuration setting information,
wherein the configuration setting screen is displayed in such a way that the function usable in the printing apparatus based on the identified function of the printing apparatus is settable,
wherein the configuration setting screen includes a setting object for setting the settable function on or off, and
wherein, when device information of the printing apparatus is acquired, on or off of the settable function in the setting object included in the configuration setting screen is automatically set on a basis of the device information of the printing apparatus.

8. The non-transitory storage medium storing the computer executable instructions according to claim 7, wherein a version of a device type is compared with a version of each capability of a printer driver, and a printer driver capability newer than the version of the device type is displayed such that the capability cannot be selected by a user.

9. The information processing apparatus according to claim 7, wherein the type of the printing apparatus is a model type of a printing apparatus and
wherein the registering registers register a plurality of model types of printing apparatus and functional information of the printing apparatus for each of the model types of printing apparatus.

* * * * *